US006851104B1

(12) United States Patent
Rodrigues da Silva

(10) Patent No.: US 6,851,104 B1
(45) Date of Patent: Feb. 1, 2005

(54) SYSTEM AND METHOD FOR PROGRAMMING USING INDEPENDENT AND REUSABLE SOFTWARE UNITS

(76) Inventor: Fernando Jose Barros Rodrigues da Silva, Parque Residencial S. Martinho do Bispo, Lote 3, Coimbra (PT), P-3040-315

( * ) Notice: Subject to any disclaimer, the term of this patent is extended or adjusted under 35 U.S.C. 154(b) by 530 days.

(21) Appl. No.: 09/638,078

(22) Filed: Aug. 14, 2000

(51) Int. Cl.$^7$ ............................................... G06F 9/45
(52) U.S. Cl. ............................................... 717/104
(58) Field of Search ............................... 717/104, 121; 709/318

(56) References Cited

U.S. PATENT DOCUMENTS

| | | | | |
|---|---|---|---|---|
| 5,680,619 A | * | 10/1997 | Gudmundson et al. | 717/108 |
| 5,724,589 A | * | 3/1998 | Wold | 709/318 |
| 5,761,511 A | * | 6/1998 | Gibbons et al. | 717/122 |
| 5,864,862 A | * | 1/1999 | Kriens et al. | 707/103 R |
| 5,884,079 A | * | 3/1999 | Furusawa | 717/109 |
| 5,913,064 A | * | 6/1999 | Chen | 717/108 |
| 6,161,148 A | * | 12/2000 | Pratt et al. | 719/315 |
| 6,345,387 B1 | * | 2/2002 | Morrison | 717/170 |
| 6,370,681 B1 | * | 4/2002 | Dellarocas et al. | 717/110 |
| 6,385,563 B1 | * | 5/2002 | Vora et al. | 703/6 |
| 6,385,652 B1 | * | 5/2002 | Brown et al. | 709/227 |
| 6,446,243 B1 | * | 9/2002 | Huang et al. | 716/7 |
| 6,496,865 B1 | * | 12/2002 | Sumsion et al. | 709/229 |

OTHER PUBLICATIONS

Gosling, James and McGilton Henry, "The JAVA Language Environment, A White Paper", May 1996, Sun Microsystems, Inc., pp. 1–85.*

Barros, Fernando et al., "Multimodels and Dynamic Structure Models: An Integration of DSDE/DEVS and OOPM", 1998, Proceeding of the 1998 Winter Simulation Conference, pp. 413–419.*

Barros, Fernando, "Abstract Simulators for the DSDE Formalism", 1998, Proceeding of the 1998 Winter Simulation Conference, pp. 407–412.*

Heineman, G.T., et al. "Emerging Technologies that support a Software Process Life Cycle" IBM Systems Journal, vol. 33, No. 3 1994, pp. 501–529.

Barros, F.J., "Modeling Formalisms for Dynamic Structure Systems" ACM Transactions on Modeling and Computer Simulation, vol. 7, No. 4, Oct. 1997, pp. 501–515.

Lafever, D. "Visual Programming and Assistive Technology" Dr. Dobb's Journal, Aug. 1999, pp. 32–38.

Szyperski, C. "Component Software: Beyond Object–Oriented Programming" Programming: Shades of Gray, ACM Press, New York, pp. 148–155.

"The Art and Science of Smalltalk", Simon Lewis Prentice Hall/Hewlett–Packard Professional Books, 1995, http://www.-uk.hpl.hp.com/people/scrl/ArtAndScience/preface.html.

* cited by examiner

*Primary Examiner*—John Chavis
(74) *Attorney, Agent, or Firm*—Scully, Scott, Murphy & Presser

(57) ABSTRACT

A programming implementation providing support for reusable software units built in a hierarchical and modular form. The implementation includes a repository of the reusable software units, where each are arranged to behave independently, communicate transparently, and facilitate creation of new reusable software units.

9 Claims, 8 Drawing Sheets

Connecton
    Node
    And
    Or
    ...
ConnectonExecutive
    Nand
    ORTest
    Sieve
    ...

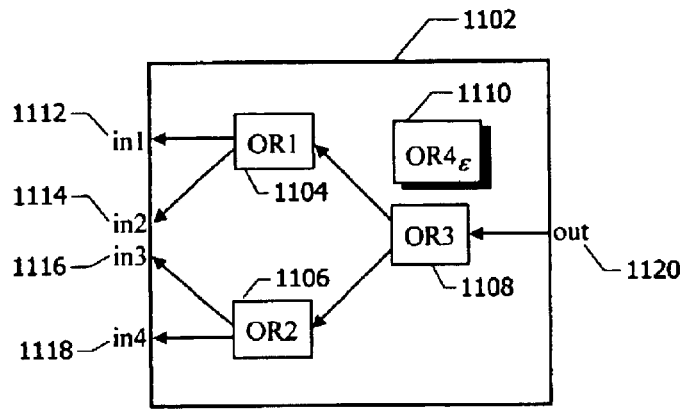

Fig. 11

--- connectonStructure
  |str|
  str := super connectonStructure.
  str addConnecton: #OR1 class: OR.
  str addConnecton: #OR2 class: OR.
  str addConnecton: #OR3 class: OR.
  str link: Network gate: #out to: #OR3 gate: #out.
  str link: #OR3 gate: #in1 to: #OR1 gate: #out.
  str link: #OR3 gate: #in2 to: #OR2 gate: #out.
  str link: #OR1 gate: #in1 to: Network gate: #in1.
  str link: #OR1 gate: #in2 to: Network gate: #in2.
  str link: #OR2 gate: #in1 to: Network gate: #in3.
  str link: #OR2 gate: #in2 to: Network gate: #in4.

Fig. 12

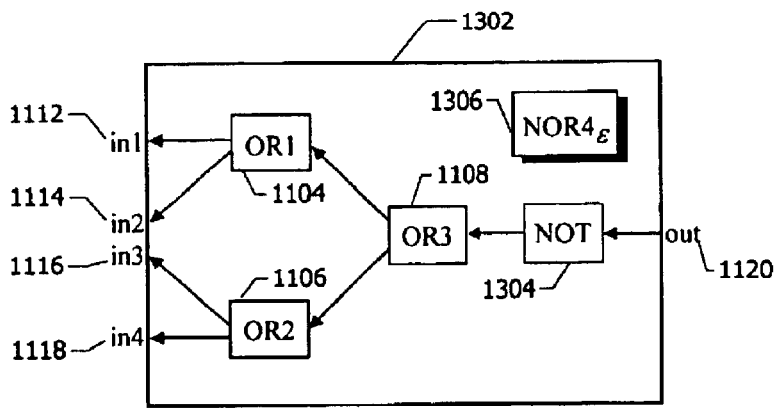

Fig. 13

| | |
|---|---|
| connectonStructure<br>\|str\|<br>  str := super connectonStructure.<br>  str addConnecton: #NOT class: NOT.<br>  str unlink: Network gate: #out from: #OR3 gate: #out.<br>  str link: Network gate: #out from: #NOT gate: #out.<br>  str link: #NOT gate: #in from: #OR3 gate: #out. | "Obtain the parent class structure"<br>"Add a not gate"<br>"Unlink OR3 gate"<br>"Link the network output to the NOT gate output"<br>"Link NOT to OR3 gate" |

Fig. 14

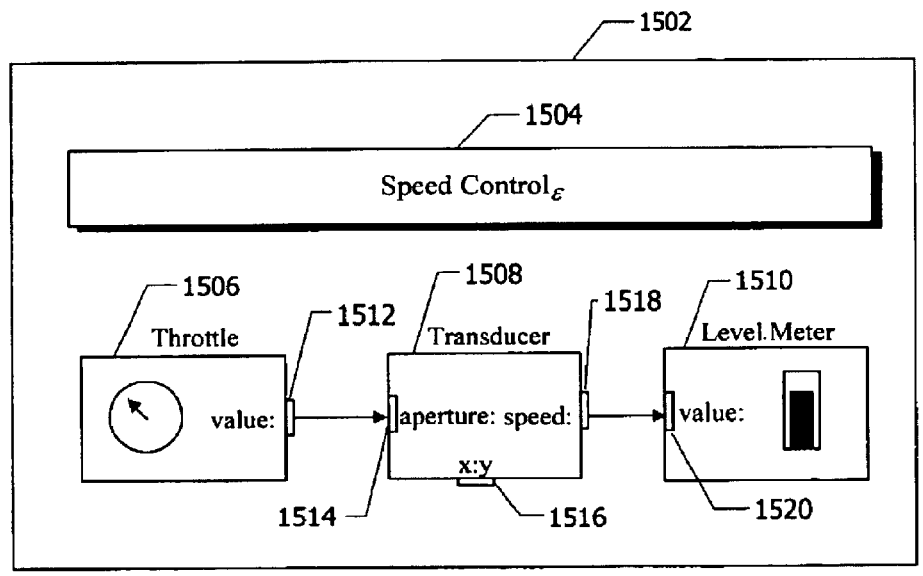

Fig. 15

SYSTEM AND METHOD FOR PROGRAMMING USING INDEPENDENT AND REUSABLE SOFTWARE UNITS

BACKGROUND OF THE INVENTION

The present invention relates generally to the reuse of software code within the area of object-oriented programming languages, and more specifically to a system constructed in accordance with a programming language where software reusability is achieved by the use of reusable software units (or connectons), defined modularly and hierarchically, and by the removal of all absolute addresses from connectons.

Software reusability is an attribute of software that facilitates its incorporation into new application programs. Software reusability has become a timely topic because of economic reasons, i.e., projects that reuse code are cheaper and take less time to complete. During the early days of computer programming, the most successful examples of software reuse were subroutine libraries. More recently, Software Design Patterns are considered to be a promising reuse technology.

I. Object Oriented Programming

A programming language is object oriented if it supports objects as a language feature, and objects belong to classes that can be incrementally modified through inheritance (i.e., Simula, Smalltalk, C++, Eiffel and Ada). The essence of object oriented programming is the hiding or encapsulation of the "inner" state of entities and the specification of interactive properties of entities by an interface of operations (the events in which they may participate).

Object-oriented languages encapsulate data as well as sequences of actions, providing a stronger encapsulation mechanism than procedures, and consequently, a more powerful modeling tool. The state of objects is to serve as a repository of data (current system state). Object-oriented programming is a modeling paradigm that represents objects of the real world by collections of interacting objects of a programming system.

Objects in programming languages are collections of operations, which share a state. The operations determine the messages (calls) to which the object can respond, while the shared state is hidden from the outside world and accessible only by object operation. Variables representing the internal state of an object are called instance variables, and object operations are called methods. The collection of methods of an object determines its interface and behavior.

Classes serve as templates from which objects may be created. Different flavors exist and, for example, in Smalltalk, classes are also objects, and exist as such even if no objects are created. Inheritance is a mechanism for sharing code and behavior, allowing the reuse of behavior of a class in the definition of new classes. Subclasses of a class inherit the operations of their parent class and may add new operations and new instance variables. Polymorphism, the ability to invoke different code to respond to the same message name, is also considered as an important characteristic of object-oriented languages.

However, even in the more regimented atmosphere of object oriented code (e.g., Smalltalk), there is still no accepted methodology to create repositories of software, which would facilitate software reuse. For that matter, other technological fields do not suffer from the software reuse problem. For example, repositories of hardware for future use are known. For that matter, the problem with objects, as distinguished from integrated circuits (ICs) is that 1) contemporary object components do not behave independently of each other; and 2) objects cannot be built in a hierarchical and modular form. The reason for the first problem is that object technology does not provide a transparent mechanism for communication among objects, as compared to ICs, which are independent from each other. The reason for the second problem is that in traditional object oriented languages, one cannot create new objects by composition of other objects, severely limiting the ability to build large hierarchical systems.

II. Software Reuse

Perhaps one of the most successful paradigms for software reuse is the model-view-controller (MVC) concept introduced by Smalltalk language, that has influenced the JavaBeans component model, see A. DeSoto. *Using the Beans Development Kit 1.0*. JavaSoft, 1997. The dependence mechanism provides some support for reuse. An object can have a collection of dependents, and when an object changes its state, it can send itself an update message; this message then sends an update message to all the dependents. Thus, an object can be built without any knowledge of its peers. The dependence mechanism permits the reuse of objects in different contexts. Also, because the dependent list can be changed in run-time, this method provides support for managing adaptive behavior.

The dependence mechanism has, however, several inconveniences. First, all the dependents must have an update method, and second, when an update message is issued, all the dependents receive the message. The message broadcast can become very inefficient, and because the update message is so general, all the parameters must be sent as arguments, making it very difficult to introduce new types of objects.

Adapters provide a mechanism for code reuse, and were first implemented in VisualWorks, see E. Gamma, R. Helm, R. Johnson, and J. Vlissides. *Design Patterns: Elements of Reusable Object-Oriented Software*. Addison-Wesley, 1995. Adapters attempt to solve the problem of connecting objects with different interfaces. In this framework, when objects with incompatible interfaces need to communicate, an adapter is created to transform message calls of one object in message calls the second object can understand.

Pipes, despite their simplicity, were one of the first constructs to provide software reuse. Pipes used in the UNIX operating systems provide an interesting mechanism for software reuse. Programs in the operating system can behave independently sending their outputs through a pipe to another program. Pipes have severe limitations, however. They can pass only unstructured data like characters, and they provide only a one-direction mechanism.

Producing software "ICs" has long been advised as a solution to software reuse, B. J. Cox. *Object Oriented Programming: An Evolutionary Approach*. Addison-Wesley, 1987. Very interesting applications of this concept can be found in, S. Koshafian and R. Abnous. *Object Orientation: Concepts, Languages, Databases and User Interfaces*. John Wiley, 1989, where a hardware application is described, and recently in, B. P. Zeigler. *Objects and Systems: Principled Design with Implementation in C++ and Java*. Springer Verlag, 1997. The construction of hierarchical and modular objects is known to be achievable by replacing object absolute addresses by parameters that are only assigned at run time when the object is created. This permits the use of the same object in different contexts (i.e., applications). While this approach is beneficial, it still includes the inherent drawback that the name of the message sent to the outside of the object is still hard-coded.

Patterns were thought to be a promising solution to software reuse, and were created to explore the limits of object oriented programming, see E. Gamma, R. Helm, R. Johnson, and J. Vlissides. *Design Patterns: Elements of Reusable Object-Oriented Software.* Addison-Wesley, 1995. Patterns categorize and exemplify how a set of classes may be used to construct a certain system. Patterns constitute a case by case reuse, but are limited. Patterns do not support the construction of independent units of software, but rather the programmer must incorporate the pattern design in the implementation. A good overview of software reuse techniques can be found in, J. Sametinger. *Software Engineering with Reusable Components.* Springer Verlag, 1997, and C. Szyperski. *Component Software: Beyond Object-Oriented Programming.* Addison-Wesley, 1998.

III. Why Objects Fail

Objects have been recognized as the solution to software low productivity. Object reuse by means of inheritance or by the use of Abstract Data Types seemed to be promising. However, those skilled in the arts soon realized that these promises were not fulfilled by the new technology. Reuse of low level objects has shown to be much easier than reuse of an overall design.

Furthermore, the object solution seems not to scale. Simple objects like lists and dictionaries can easily be reused but complex applications cannot. For example, reusing a graphical editor as a whole is more complex than reusing the constituting classes when they are viewed as independent units. The problem becomes more evident as the size and complexity of the application begins to grow. This difficulty has been assigned to the lack of comments in the code, and also to the low commitment to reuse by software engineers. Although some part of this may be true, we believe that the problem only becomes marginally smaller by using informal techniques. We are convinced that the object methodology is responsible for the crises, and consequently, a paradigm shift towards more powerful concepts is needed.

Difficulty also arises from the fact that higher level programming languages, from their very beginnings, are based on the limitations of the machines in which they were designated to operate, i.e., they try to make efficient use of hardware while improving human readability. The generalized use of pointers and subroutine calls is symptomatic of a machine-oriented design. Although objects (in object oriented programming languages) have introduced the concept and use of "state", object messages are still not very different from routine or procedure calls and use.

Developed in a different science, "General Systems Theory", M. D. Mesarovic and Y. Takahara. *General Systems Theory: A Mathematical Foundation.* Academic Press, 1975 and B. P. Zeigler. *Theory of Modeling and Simulation.* John Wiley, 1976, the concept of "system", appears to provide a better abstraction than objects by providing modular and hierarchical description and offering the concept of polymorphism. Systems, however, are still unable to provide a basis for software reusability. The implementation of system concepts is contrary to the design of "quick and dirty" programming languages, required during the time that computers were quite slow. In addition, due to the contrast between the timed, asynchronous and pull nature of systems, and the non-timed, synchronous and push nature of most programming languages, adapting systems concepts to programming languages is a substantial problem.

IV. Object Axioms

In almost every language a routine, a function, or a message call has one of the following formats:

[variable :=] object message [arguments].    (1)

[variable :=] self message [arguments].    (2)

Brackets mean that the term is optional. Without loss of generality, we use the Smalltalk convention for message calls. In non-object oriented languages, what is termed as an "object" is usually sent as an argument to a routine, that have been renamed by message in the "object paradigm" (of object oriented programming languages).

Statement 2 poses no problem for reuse for it just assumes that an object knows its own details. However, Statement 1, in spite of its simplicity and its apparent inoffensiveness, retains all the four features that destroy any serious attempt to software reuse, no matter how much effort is employed. These 4 features (the group of four, or G4 for short) kill any chances of producing real software ICs. This G4 assumption can be described by the following four axioms:

I) Existence of the receiver. Statement 1 assumes that the receiver object does exist.

II) Uniqueness of the receiver. Statement 1 assumes that the message is sent to just one object.

III) Knowledge of the receiver. Statement 1 assumes that the object address is known.

IV) Knowledge of the message. Statement 1 assumes that the method invoked in the receiver object is known.

This is too much for just one simple assignment, and these assumptions have destroyed any chance of conventional object reuse. Hence, these underlying 4 axioms prove to be deadly to software reuse in any of today's paradigms. While several software paradigms have reduced some of these constraints, no conventional systems are known to exist that have reduced them all. Although these axioms are evident, their limitations to software reuse seem never to have been fully described and exploited.

More particularly, Axiom I states that if an object must communicate with another object, this other object must exist. This assumption, which seems to be a universal rule, is fallacious. A software entity must work without any assumption about its neighbors, even about their existence, if it is to be able to operate independently. Axiom II states that objects communicate on a one-to-one basis. The same comments set forth with respect to axiom I can be applied here.

Axiom III assumes that the object absolute address is known. Absolute address is another factor that makes reuse very difficult. Objects that have addresses hard-coded by no means can be used in different contexts. To reuse objects that satisfy this axiom, it is necessary to replace absolute addresses by new ones, and then recompile the system again. Because addresses are scattered through the code, these changes are virtually impossible in complex systems.

Axiom IV is where machine oriented language design is more visible and where it makes more damage. Deciding the name of the message to send to an object is always fixed in programming languages.

The Smalltalk dependence mechanism was probably the first successful attempt to remove axioms I and II. The reader should note that the dependence mechanism might be described as a relationship between objects where one object can receive information about changes made in another object. In this framework update messages are sent to a list of dependents, and this list can have zero or more elements.

Axioms III and IV have been partially removed by the use of adapters. Instead of sending messages directly to an object, messages are sent to an intermediate object known as the adapter that converts one object interface to another. Facade systems based on graphical systems give the false impression that axioms III and IV have been removed. However, the underlying mechanism is so complex that the best that can be expected is that the components existing in the library are enough to build an application, otherwise lots of difficult tricks must be mastered to complete the programming task, see *Extend User's Manual*. Imagine That Inc., 1997.

Statements 1 and 2 also assume an underlying synchronous design. In most of the programming languages the execution control waits until the call of statement 1 terminates before executing the next statement. In asynchronous programming languages, usually running multiple threads of control, the execution of statements 1 does not need to terminate before the control of execution is given to the next statement. Some programming languages provide a mixture of these 2 characteristics, and the programmer can choose what calls are synchronous and what call are asynchronous. However, synchronous and asynchronous characteristics are orthogonal to the problem of software reuse.

OBJECTS AND SUMMARY OF THE INVENTION

It is therefore an object of the present invention to provide an application written in connecton-oriented code by which very large systems may be constructed in accordance with modular and hierarchical software building, which overcomes the shortcomings of the prior art.

It is another object of the invention to provide a scalable mechanism, which completely isolates connectons (reusable software units) from their peers.

It is still another object of the invention to provide a mechanism where the G4 assumptions discussed above are removed.

It is yet another object of this invention to provide simple and sound mechanisms with only a few, but powerful, concepts so they can be easily mastered and are easy to use. The provided solution must scale, that is, not only huge software projects would benefit from it, but also any and every trivial piece of software could be designed for reuse if necessary.

V. Basic Connectons

To that end, the present invention with its concept of connectons was designed to provide these solutions. Connectons are based on the concept of General Dynamic Structure System, see F. J. Barros, "Formalisms for Dynamic Structure Systems," *ACM Transactions on Modeling and Computer Simulation*, Vol. 7, No. 4, pp. 501–515, 1997.

A connecton communicates with the outside world only by gates. Gates are thus the only access points to connectons. Object technology also claims something similar. In fact object technology provides a clear mechanism for an object to be accessed. However, the dual mechanism to access other objects from within an object was forgotten. One explanation may account for this fact. Invoking a message is just a jump to some specific memory location, a legacy from machine code and machine architecture. Sending a message to an unknown or possibly non-existing object with an unknown interface, that is, removing the G4 axioms, would seem magic.

Gates, as mentioned, are the only way to interact with a connecton, and by interaction we mean both input and output interactions. This type of interaction, providing both input and output separation from the outside, offers a powerful paradigm to build really reusable software.

The kernel of software reuse as provided by connectons is the pseudo variable out. This variable is responsible for handling all the output interaction of a connecton and its meaning can only be accessed at run-time. This concept provides a definition of each connecton absolutely independent from other connectons. The variable out can represent none, one or many connectons, and represents an abstraction of the outside world only by itself, the out concept would be of little use if we could not discriminate the access to the outside world. This discrimination is achieved by the concept of gate. A gate can be defined as a selector or a parameter of connecton interaction. Gates provides the fine grain discrimination that lacks the Smalltalk dependence mechanism. With the out and gate constructs we have removed the first 3 axioms of G4.

To remove Axiom 4 we introduce the concept of channel. A channel, or link, is a bi-directional connection between two gates. An assignment, the most common way of interaction, is a two-sided communication mechanism. The sender connecton issues a message with possibly several parameters, and the receiver, using the same communication channel, sends a result.

Systems (within the art of System's Theory) were designed to represent asynchronous communications, like those found in simulation frameworks see B. P. Zeigler. *Theory of Modeling and Simulation*. John Wiley, 1976, and thus systems have only been provided with a one way communication mechanism. This simple fact prevents systems theory from being used as a general framework for programming. Although in principle, a synchronous system can be represented by an equivalent asynchronous system, this transformation would lead to cumbersome specifications, because all synchronous communications should be represented by two one-way links, thus doubling the interface of any synchronous system.

VI. General Description of the Invention

In one embodiment, the invention comprises a programming implementation for use with an object oriented programming language which supports delegation, the implementation providing for reusable software units built in a hierarchical and modular form is disclosed herein as one embodiment of the invention. The implementation includes a repository of the reusable software units, where each are arranged to behave independently, communicate transparently and facilitate creation of new reusable software units.

The reusable software units are arranged to display a scalable mechanism to thoroughly isolate each said reusable unit from its peers, and to facilitate reuse of an overall software system design constructed with said reusable software units. The reusable software units communicate to the outside world by use of both input and output gates, which are the only means for communicating with said reusable software units. The reusable software units are arranged to further include a pseudo variable out, that is only meaningful when accessed at run-time. This variable abstracts the outside world of each connecton and its meaning depends on what reusable software units are linked to the connecton at the moment of code execution, that is, at run time.

The reusable software units are arranged in an interconnection via bi-directional channels, do not include absolute addresses and are dynamically configurable. Moreover, each connecton (software unit), is be described by a model M given by $$M = (\text{inGates}, \{\text{inSign}_g\}, \{a_g\}, Q, q_0, \text{outGates}, \{\text{outSign}_{gt}\}, \{\text{outFunction}_{gt}\})$$

where in Gates is the set of input gates, outGates is the set of output gates, $a_g$ is an action for every g in inGates, Q is the set of states, $q_0$ is the initial state, $\text{inSign}_{gt}$ is the input-to-output signature of every gate gt in outGates, $\text{outSign}_{gt}$, is the output-to-input signature of every gate gt in outGates, and outfunction$_{gt}$ is the output function of every gate gt in outGates. An input signature is a 2-tuple containing the range sets of incoming and outgoing parameters, and an output signature is a 2-tuple containing the range sets of outgoing and incoming parameters.

A plurality of connectons may be combined to construct a connecton network E (or connecton ensemble), defined by $$E=(\text{inGates},\{\text{inSign}_g\}, \epsilon_g, M_c, \text{outGates}, \{\text{outSign}_{gt}\}, \{\text{outFunction}_{gt}\})$$

where $\epsilon_g$ with model $M_c$ is the ensemble executive a special model that keeps the ensemble structure. The ensemble executive includes a structure function σ: Q→Σ* that maps executive states to a structure, where each Σ∈Σ* is equal to $(C,\{M_c\},L,\Xi)$, where C is the set of connectons that belong to the ensemble, $M_c$ is the definition of every connecton c belonging to set C, L is a set of channels, that represent the interactions among connectons. Ξ is the order function that describes the order actions will be invoked.

In the implementation, structural inheritance is utilized to build new connectons from existing connectons, and traditional objects may be utilized as connectons having no output gates. Changes in the network structure are achieved by changing the executive state. The structure depends on executive state, being the map made by function σ.

BRIEF DESCRIPTION OF THE DRAWING FIGURES

FIG. 11 is a schematic diagram depicting a 4-input OR gate class (network) comprising 3 basic 2-input OR gate connectons;

FIG. 12 is a representation of the code definition of the OR4 class depicted in FIG. 11;

FIG. 13 is a schematic diagram of a NOR4 class derived from the OR4 class depicted in FIG. 11;

FIG. 14 is a representation of the code definition of the NOR4 class depicted in FIG. 13;

FIG. 15 is a schematic representation of a speed control system (class), implemented to display the speed of a car;

DETAILED DESCRIPTION OF THE INVENTION

VII. Connectons Implemented Herein

Figure 1:
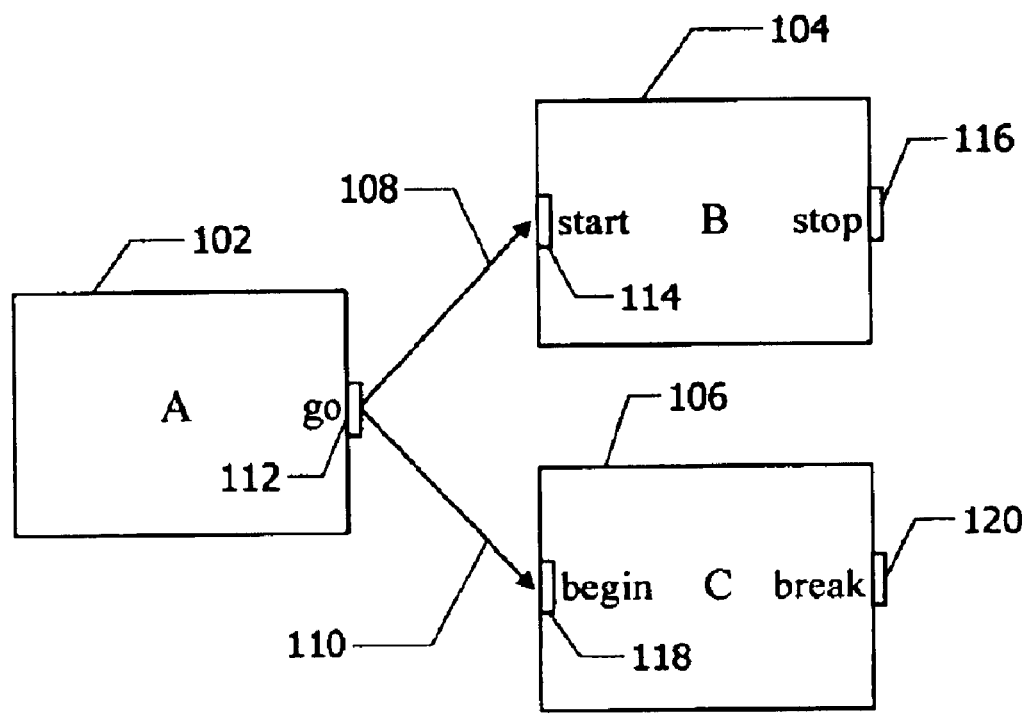
FIG. 1 is schematic diagram depicting the interconnection of several connectons of this invention.

FIG. 1 represents a possible connection among three connectons A 102, B 104 and C 106 according to the present invention. Connecton A is linked to connecton B through a channel (link) 108 starting at gate go 112 of connecton A, and ending at gate start 114 of connecton B. Connecton A is linked to connecton C through a channel 110 from gate go 112 to gate begin 118. Connecton A is linked to connectons B and C. However, there could be more linked connectons. Connecton A could be linked just to one connecton, or it could be linked to no connecton at all. For example, connecton B has a gate stop 116 and connecton has a gate break 120, which gates are linked to no other connecton. A channel, or link, makes the interface between two different gates, thus a connecton only needs to know its own output gates. The name of the gates of outside connectons, that represent message names, are entirely handled by the channel support, permitting removal of Axiom 4. It may look strange that although channels represent a bi-directional communication link, they are represented by an arrow. The arrow represents the direction of the request, the requested information travels is in the opposite direction and thus is not explicitly represented.

As mentioned above, every connecton has a variable (pseudo variable) called out that provides the communication with the outside connectons. In the example of FIG. 1, the interaction between connecton A and connectons B and C is achieved by the statement out go. This meaning should be clear, a message called go is sent to the outside world. Its effect depends on the connectons currently linked from that gate. In this example, connectons B and C invoke their own methods start and begin, respectively. In a general case, all the connectons linked to gate go invoke some method prescribed by their input gates.

VIII. Concern Definition

Each connecton has its own description referred to as the connecton model. Given a connecton M, its model is described by $$M=\{\text{inGates}, \{\text{inSign}_g\}, \{a_g\}, Q, q_0, \text{outGates}, \{\text{outSign}_{gt}\}, \{\text{outFunction}_{gt}\}\}$$

where inGates is the set of connecton input gates, outGates is the set of connecton output gates, $a_g$ is an action for every gate g belonging to set inGates, Q is the set of connecton states, $q_0$ is the connecton initial state, inSignN$_g$ is the input-output signature of every gate g in inGates, outSign$_{gt}$ is the output-to-input signature of every gate gt in outGates, and outFunction$_{gt}$ is the output function of every gate gt in outGates.

An input signature is a 2-tuple containing the range set of the incoming parameters and the range set of outgoing parameters. For example, if input gate g receives real values R, and responds by sending integer values I, then is input signature is given by $$\text{inSign}_g=(R,I)$$

An output signature is a 2-tuple containing the range set of the outgoing parameters and the range set of incoming parameters.

The function $a_g$ on input gate g of signature $(I_g, O_g)$ is expressed by $$a_g: Q \times I_g \to Q \times O_g.$$

An action corresponds to a method in the object paradigm. An action $a_g$ receives input values from $(Q \times I_g)$, produces a change in the connecton state, and returns a value from $O_g$. As a side effect, an action on a connecton can trigger other actions on the connectons linked to it. An action can trigger state changes in other connectons, but these changes are made by actions defined on those connectons, so modularity is not jeopardized. We do not attempt to make a formal definition of this side effect for it will be clear in the next examples.

Output functions convert the set of values received by an output gate. These functions are very useful when several channels are linked to an output gate, and in general, to convert values without creating special connectons. For example in a bank application (FIG. 3), if gate deposit: is linked to a set of bank accounts, the following action defined in the DEMOS system, a Smalltalk implementation of the connecton paradigm disclosed herein, interrogates the several accounts for their money value ^total :=out deposit: myself "myself represents the client connecton"

The value of variable total is the result of applying the output function over the set of values returned by the connectons linked from gate deposit:. If we are interested in the total amount we need to define an output function that sums the values from all the accounts represented in the valueList array returned to gate deposit:. This function is defined by outputFunction$_{:deposit:}$ {valueList}

```
value := 0.
for i := 1 to (valueList size) do
    value := value + valueList[i]
endFor
return(value)
```

In the current implementation, if no output function is defined, the following default function, named ϕ, is used defaultOutputFunction(valueList)

```
if (valueList size = 0)
    return(nil)
else
    sz := valueList size
    return(valueList[sz])
endIf
```

This function just returns nil if no channel links to a gate and returns the last value from the input list, if there is at least one channel. This behavior seems to cover the most common situations and it seems to be preferable to just return a list of values.

IX. The OR Connecton

Figure 2:
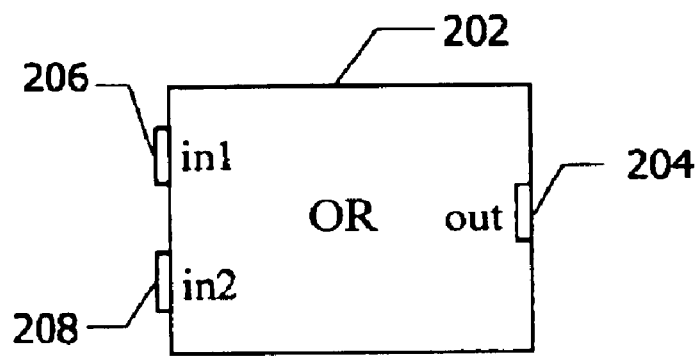
FIG. 2 is a schematic diagram depicting an OR connecton, implemented in accordance with the principles disclosed herein.

FIG. 2 represents an OR connecton 202. This connecton has one input gate called out 204, and two output gates called in1 206 and in2 208. The input gate corresponds to an action (method) defined in the connecton. The output gates correspond to request for actions (message calls) that a connecton can send to its peers. The OR connecton has no internal state and computes the logical Or of the values present at output gates in1 and in2. This connecton is described by OR=({out}, {(∅,B)}, {$a_{out}$}, {(in1,in2)}, {∅,B),(∅,B)})

where B={0,1} is the set of Boolean values, and ∅ represents that no value is needed. The output function is omitted for no adaptation is needed.

When the OR element receives a message on gate out, it asks for two values through gates in1 and in2 and returns the logical Or of these two values.

We describe now the implementation in the DEMOS system, a Smalltalk implementation of the Connecton paradigm. The OR connecton has two actions (methods): inGates and outGates, that define, respectively, input and output gates.

inGates
    ^super inGates add: #out.
outGates
    ^super outGates add: #in1; add: #in2.

The code for action out that computes the logical Or is given by out

| |a b| | |
| --- | --- |
| a := out in1. | "Obtain the value at gate in1" |
| b := out in2. | "Obtain the value at gate in2" |
| ^a\|b | "Returns the logical Or" |

As mentioned before, the access to outside connectons is achieved by the use of the pseudo-variable out. The name of the output gates provides just an alias to access the gates of other connectons. There is also no need for a connecton to know the names of other connecton actions, i.e., their input gates. The pseudo variable out and the gate concept permit to define the OR connecton without any reference to other connectons.

X. Bank Account Example

Figure 3:
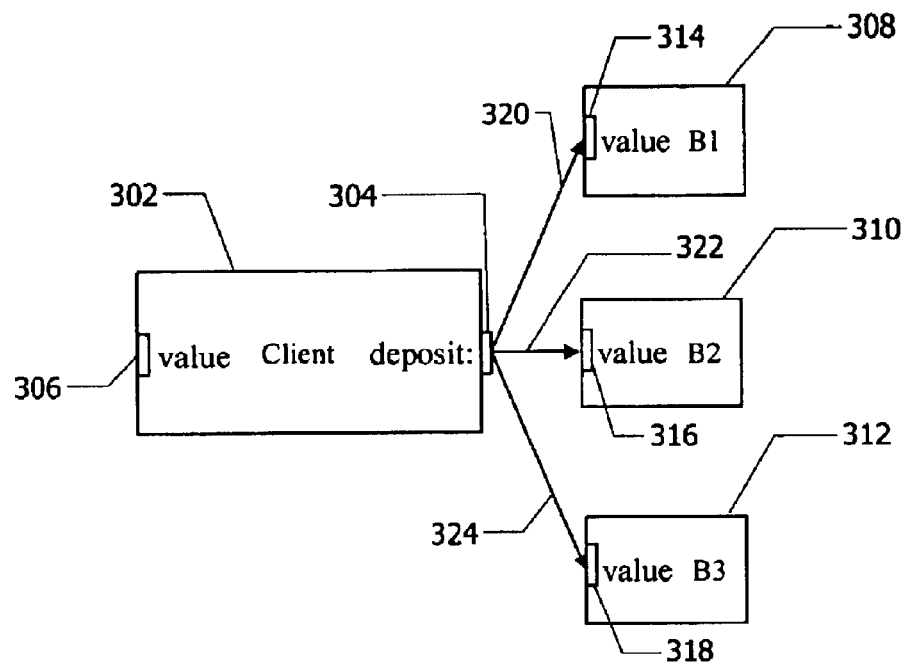
FIG. 3 is a schematic diagram depicting a bank account implementation, including a client connecton, implemented in accordance with the principles disclosed herein.

We describe now, in more detail, the bank account example used in a previous section. FIG. 3 represents the client connecton 302 that receives in the output gate deposit: 304 the values deposited in bank accounts B1, B2 and B3 at respective connectons 308, 310, 312. The connectons 308, 310, 312 have respective value gates 314, 316 and 318 that are linked to the client connecton via respective channels or links 320, 322, 324. The client is described by C=({value}, {(∅,R)}, {$a_{value}$}, {deposit:}, {(Names,R)}, {ouputFunction$_{deposit:}$})

where Names is the set of client names (not defined here for simplicity).

Output gates and the respective output function are defined by the method outGates given by ^super outGates add: #deposit: function: [:x|x inject: 0 into:[:a :b| a+b]]

Gate deposit: is attached to an output function described in Smalltalk by the block: [:x| x inject: 0 into: [:a :b| a+b]]. This block converts the input list into a single value (the sum of values in the list). This function also provides the default value 0 if no channel is connected to gate deposit. The action associated with input gate value 306 is defined byvalue 'out deposit: myself where myself represents the bank customer.

XI. Network of Connectons

A connecton network, or connecton ensemble, is a complex connecton built by the composition of other connectons. It is defined by $$E = (inGates, \{inSign_g\}, \epsilon, M_g, outGates, \{outSign_{gt}\}, \{outFunction_{gt}\})$$

This definition introduces the ensemble (network) executive $\epsilon$, and its model $M_g$, a special connecton that maintains the ensemble structure. The executive keeps a list of the connectons that compose the ensemble and also keeps a list of the channels existing among connectons. This information is not static, and can be changed by executive actions. The executive is defined by $$M_g = (inGates, \{inSign_g\}, \{a_g\}, \sigma, \Sigma^*, Q, q_0, outGates, \{outSign_{gt}\}, \{outFunction_{gt}\})$$

A special function is defined in the executive that maps the executive state into an ensemble structure. The structure function is expressed by $$\sigma: Q \rightarrow \Sigma^*$$

Each structure $\Sigma$ in $\Sigma^*$ is given by $$\Sigma = \{C, \{M_c\}, L, \Xi\}$$

where C is the set of connectons that belong to the ensemble, $M_c$ is the model (definition) of each connecton c belonging to set C, L is a set of channels and $\Xi$ is the order function.

A channel is a 3-tuple defined by $((i,g_i), (j,g_j), (dF,rF))$, where i is the name of the source connecton, $g_i$ is a gate of the i connecton, j is the receiver connecton, $g_j$ is a gate of j, dF is the channel direct filter, and rF is the channel reverse filter. When absent, dF and rF are assumed to be the identity function. The identity function IDY, is a function that just yields the input parameter. It is given by $IDY(x)=x$.

When value a x is sent from gate $g_i$ to gate $g_j$ by a channel with filter (dF,rF), connecton j performs j $a_{gj}$ dF(x) and returns the value rF(j $a_{gj}$ dF(x)), being the action executed only once. In the previous statements we assume the Smalltalk syntax for message calls given by: object message arguments, where the arguments are omitted if the message needs no parameters.

Filters transform both the values sent and received by a connecton. For example if a connecton works with values in Miles and needs to communicate with connectons operating in Km, then filtering capabilities provide an elegant solution to make this conversion without the creation of additional connectons to make the adaptation. In this case the direct filter would be given by $df(x)=1.65x$, and the reverse filter would be given by $rF(x)=x/1.65$ to make the conversions between Miles and Km.

$\Xi: L^+ \rightarrow L^+$ is the order function, where $L^+$ is the set of all sets of links (excluding the empty sequence).

The order function establishes the order of the outside calls when several channels are linked from the same output gate. For simplicity, we omit reference to this function for the remainder herein by assuming a non-deterministic order.

The initial structure of the ensemble $\Sigma_o$ is given by $\Sigma_o = a(q_0)$, where $q_0$ is the executive initial state.

XII. Random Logic Application

Figure 4:
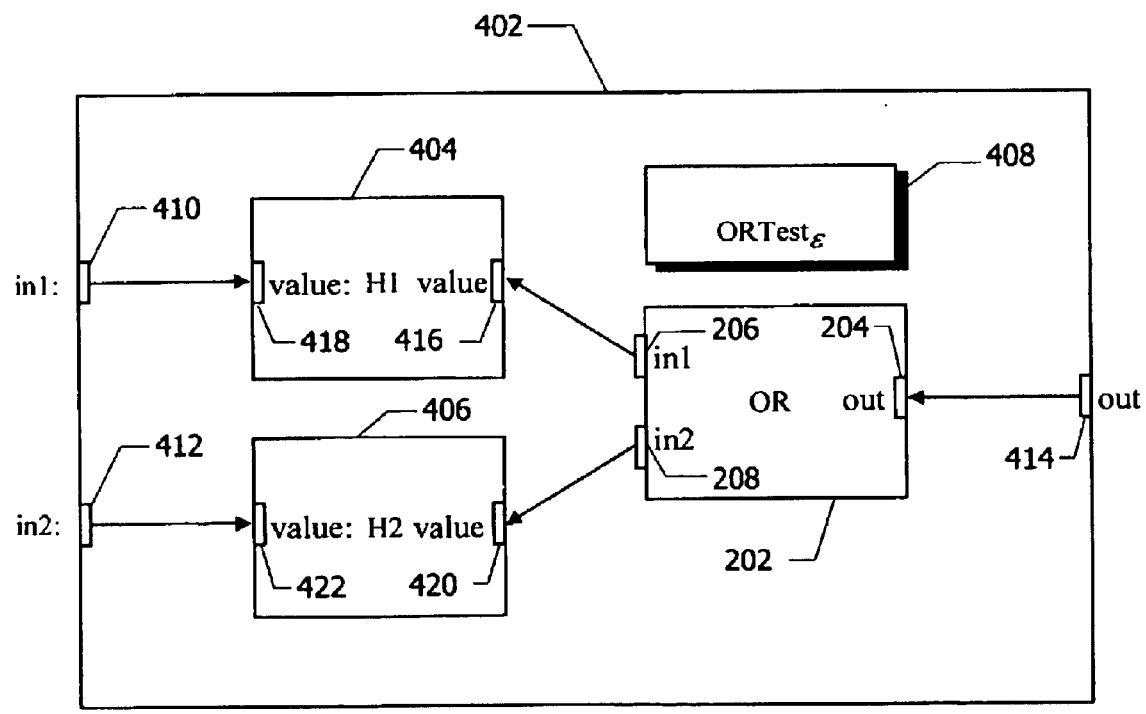
FIG. 4 is a schematic diagram depicting an ORTest connecton ensemble implemented in accordance with the principles disclosed herein.

FIG. 4 represents an ensemble with three connectons 202, 404 and 406, and the executive 408. The ensemble is defined by $$M_{ORTest} = (inGates, \{inSign_g\}, \epsilon, M_e)$$

where $inGates = \{in1:, in2:, out\}$ $inSign = \{(B, \emptyset), (B, \emptyset), (\emptyset, B)\}$ $M_e = (\{q_0, \epsilon\}, q_0, \epsilon, \sigma, \Sigma^*)$.

The executive has just one state that corresponds to a single ensemble structure defined by $$\sigma(q_0, c) = (C, \{M_c\}, L$$

where $C = \{H1, H2, M_{OR}\}$ $\{M_c\} = \{M_{H1}, M_{H2}, M_{OR}\}$ $L = \{((ORTest, in1:), (H1, value:)), ((ORTest, in2:), (H2, value:)), ((OR, in1), (H1, value)), (OR, in2), (H2, value)), ((ORTest, out), (OR, out))\}$.

The following example explains how connectons may be used within a program. First, we define a "holder" connecton. A holder connecton has two input gates: 1) value: that sets a state variable to a given value storing this value, 2) value that returns the stored value. The connecton ensemble 402, represented in FIG. 4, is composed of one OR connecton 202, linked to holder connectons, H1 404 and H2 406. The ensemble has two input gates in1: 410 and in2: 412 to set logical values, and the gate out 414 to communicate the result.

The ensemble connecton is called ORTest and includes the executive connecton, $ORTest_g$, that holds the overall structure. The structure of any ensemble is defined by the method connectonStructure that every ensemble class must define. The variable Network is an alias for the actual network (ensemble). The ORTest connecton network is defined in the DESMOS system by connectonStructure

```
|str|
str := super connectonStructure.
"Obtain the structure of the parent class"
str addConnecton: #H1 class: Holder.    "Adds Holder H1"
str addConnecton: #H2 class: Holder.    "Adds Holder H2"
str addConnecton: #OR class: OR.        "Add an OR connecton"
"Links the Network to H1"
str link: Network gate: #in1: to: #H1 gate: #value:.
"Links the Network to H2"
str link: Network gate: #in2: to: #H2 gate: #value:.
str link: #OR gate: #in1: to: #H1 gate: #value. "Links OR to H1"
str link: #OR gate: #in2: to: #H2 gate: #value. "Links OR to H2"
^str.
```

To test this network, we use the method or Test that is defined in DESMOS by orTest

```
|orN value|
orN := ORTest new.    "Creates a ORTest Network"
orN in1: true.        "Sets the in1: gate value"
orN in2: false.       "Sets the in2: gate value"
value := orN out.     "Computes the Or value"
Transcript nextPutAll: value asString; cr.    "Prints the value"
```

The message new sent to the Connecton class ORTest creates a new connecton with the structure defined in its connectonStructure class method. As gate names correspond to method names, standard object messages can be used to communicate with connectons.

XII. Scaling

Figure 5:
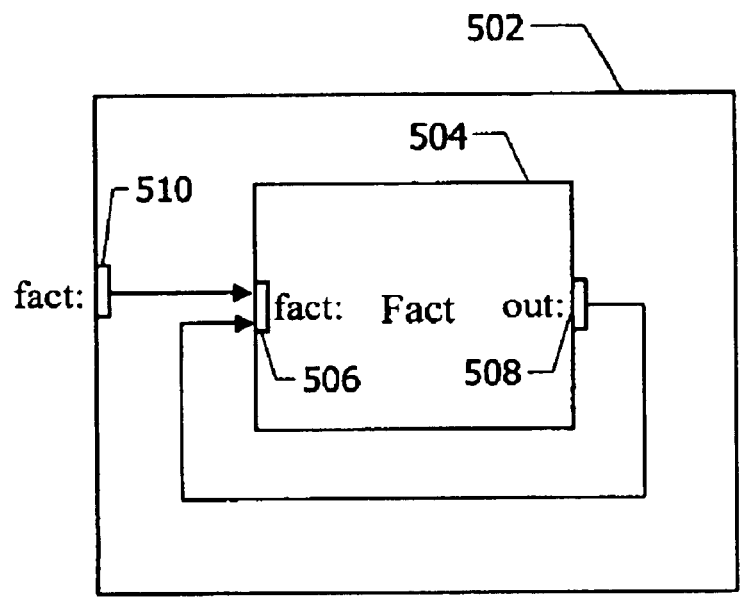
FIG. 5 is a schematic diagram depicting a factorial connecton, implemented in accordance with the principles disclosed herein.

Modularity and hierarchy connecton building can be used as a paradigm to represent very complex systems. FIG. 5 illustrates how "small" connecton granularity may be. We model the factorial function by a connecton. In FIG. 5, a connecton 502 receives an initial value n at gate fact: 510 for calculating a factorial. The value n is then transmitted to gate fact: 506 of a factorial connecton 504, which determines the factorial of the initial value n by recursively transmitting values associated with the factorial from gate out: 508 to gate fact: 506 of the factorial connecton 504. The recursive definition of factorial is given by fact(n)
   if n=0
      1
   else
      n×fact(n−1)

The connecton representation of this function for connecton 504 is given by fact: n
   n=0 ifTrue: [^1].
   ^n*(out out:(n−1)).

In FIG. 5, the factorial executive was omitted for simplification. While this example is merely illustrative, it shows that the connecton paradigm may be used for representing arbitrarily small components.

XIV. Changes in Connecton Structure

Figure 6:
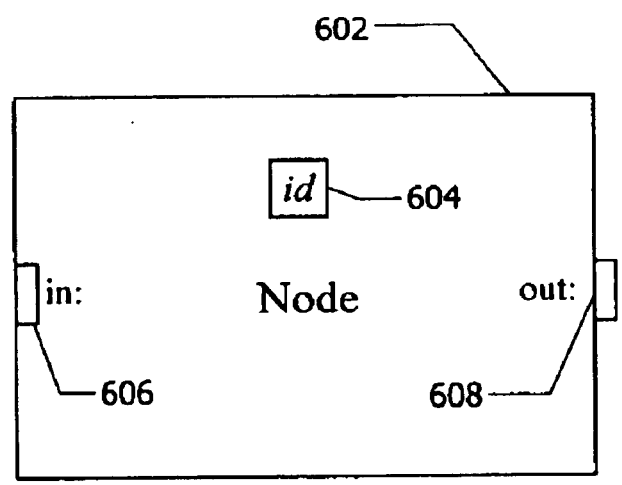
FIG. 6 is a schematic diagram depicting the basic Node connecton, used to build an Erastosthenes sieve of prime numbers in accordance with the principles disclosed herein.
Figure 7:
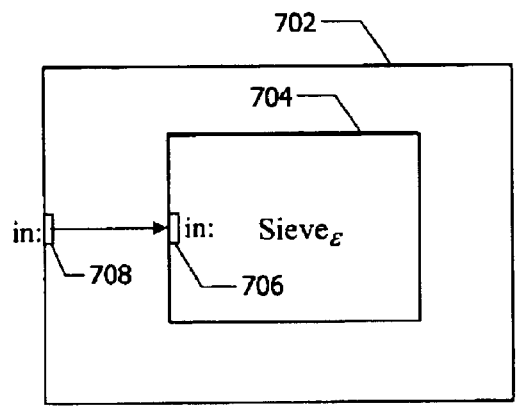
FIG. 7 is a schematic diagram of an Erastosthenes sieve initial configuration arranged in accordance with the principles disclosed herein.
Figure 8:
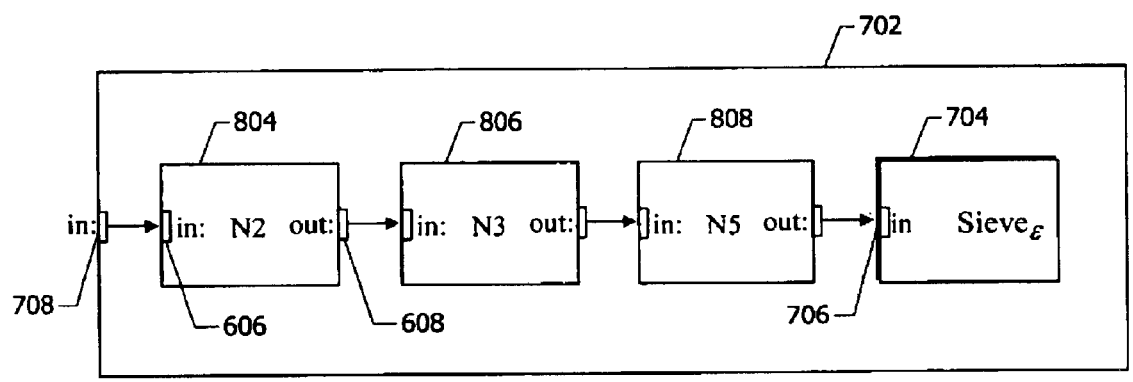
FIG. 8 is a schematic diagram of a pipeline shown after receiving a sequence <2,3,4,5,6>, including nodes N2, N3, and N5 for primes numbers 2, 3 and 5, respectively.

FIG. 6 shows the Node connecton 602 that serves as a basis to build the Erastosthenes sieve of prime numbers. In FIG. 6, the connecton 602 holds a number id 604 and receives an incoming number via gate in: 606 and transmits an outgoing number via the gate out: 608. FIG. 7 represents the Erastosthenes sieve connecton 702 initial configuration, having an executive connecton 704. In FIG. 7, the sieve connecton 702 receives a number via gate in: 708, and the executive connecton 704 also recives a number via gate in: 706. Each connecton 804–808 of Erastosthenes sieve connecton 702 in FIG. 8 is based on connecton 602 in FIG. 6 and holds a different prime number named id (not shown here for simplicity). Each connecton 804–808 tests if it can divide an incoming number received at gate in: by id. If the connecton can divide the incoming number then the number is discarded for it is not prime. If the number cannot be divided by id, the connecton sends the number to other connectons, which perform the same test, and so on. If the number cannot be divided by the last connecton 808 in the chain, the connecton sends a signal to the executive connecton 704 to create a new connecton to handle the found prime. This action is defined by in: aNumber
   (aNumber \ \ id=0) ifTrue: [^nil]. "Tests if aNumber is divisible by id"
   ^out out: aNumber "Sends the number to the next node for checking."

In this simplified and non optimized version of the sieve each node can only give a negative answer. Saying that a number is prime involves the cooperation of all the nodes. A number is considered to be prime no node in the pipeline that can divide it. The message outs directs the question from a connecton to its neighbor. The last connecton is linked to the executive and the call out: aNumber tells the executive to create a new node to handle the found prime. The initial configuration of the Erastosthenes Sieve is represented in FIG. 7. This model has just the network executive and no prime numbers. The following method tests the pipe with a sequence of 1000 numbers !Pipe class method!
test
   |p|
   p :=Pipe new: #P.
   2 to: 1000 do: [:n| p in: n].

Variable p represents the pipeline network. The interface between connectons and objects is straightforward, a connecton is seen by objects as another object. Thus the call p in: n invokes the action in: n of the pipeline network.

The structure of the pipeline after receiving the sequence <2,3,4,5,6,> is represented in FIG. 8, where there is a node for primes 2, 3 and 5, represented by nodes (connectons) N2 804, N3 806 and N5 808, respectively. Initially, the network contains just the executive connecton 704 connected to gate in: 708 as depicted in FIG. 7. When the first number arrives the executive connecton creates the first connecton 804, disconnects itself from the network (i.e., disconnecting itself from gate in: 708) and connects the created connecton to the network (i.e. connecting gate in: 606 of connecton 804 to gate in: 708 of connecton 702) and to itself (i.e., connecting gate out: 608 of connecton 804 to gate in: 706 of connecton 704). The executive connecton becomes the last connecton. The other depicted connectons 806 and 808 are added in the same fashion. The action in: aNumber handles the arrival of a prime number to the executive connecton and it is defined by !Pipeline Interface method!

in: aNumber
   DESMOS, the embodiment of the invention implementing the connecton paradigm as disclosed herein is built on the Smalltalk language, see *Smalltalk MT User's Guide*. Object Connect, 1995. Smalltalk was used for simplicity of the delegation implementation. However, the DESMOS implementation of the connecton paradigm of this invention is not limited to Smalltalk, but to any object-oriented programming (OOP) language that can use delegation and reflection. The reader should note that those skilled in the art will understand how and which changes to make in conventional compilers/interpreters of existing languages in order to implement an embodiment of this invention.

---

|n new gate|
new := ('N',aNumber asString) asSymbol. "Node name: #N<aNumber>"
n := self add: new class: Node. "creates a new nod""
n id: aNumber. "Sets the id of the new node"
last = #Network ifTrue: [gate := #in:]
ifFalse: [gate := #out:]. "Sets the gate variable"
"Unlinks the last node (or the network)"
self unLink: last port: gate from: #Executive port:#in:.
"Links the last node to the new node"
self link: last port: gate to: new port:#in:.
"Links the new node to the executive"
self link: new port: #out: to: #Executive port: #in:.
last := new. "The new node becomes the last node"
^aNumber.

---

XV. The DESMOS System

DESMOS, the embodiment of the invention implementing the connecton paradigm as disclosed herein is built on the Smalltalk language, see *Smalltalk MT User's Guide*. Object Connect, 1995. Smalltalk was used for simplicity of the delegation implementation. However, the DESMOS implementation of the connecton paradigm of this invention is not limited to Smalltalk, but to any object-oriented programming (OOP) language that can use delegation and reflection. The reader should note that those skilled in the art will understand how and which changes to make in conventional compilers/interpreters of existing languages in order to implement an embodiment of this invention.

Figures 9, 10:
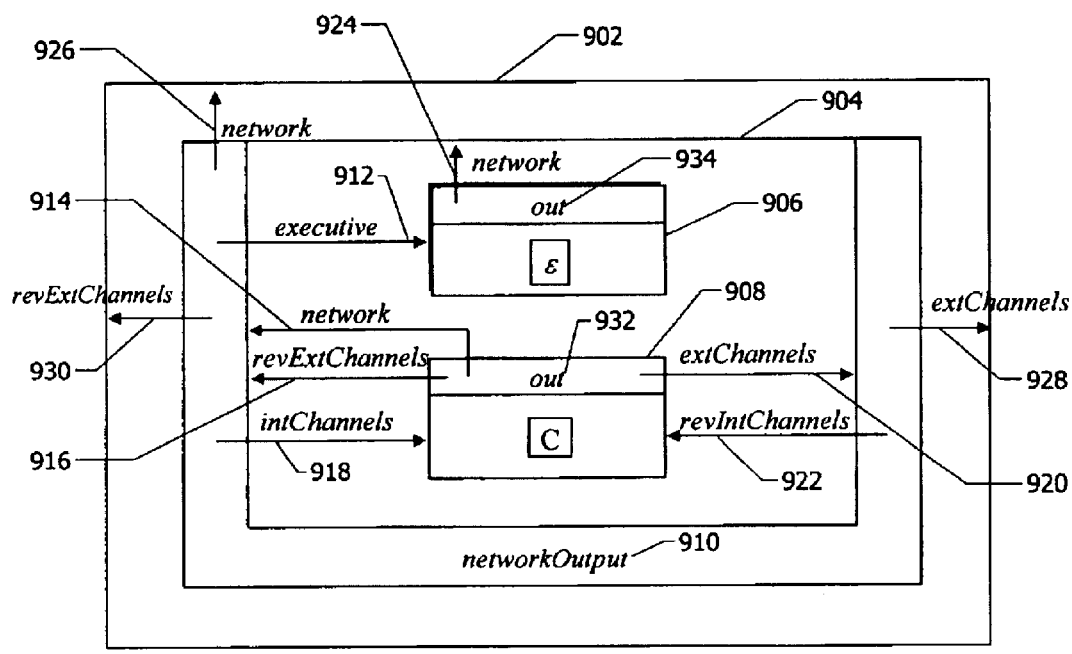
FIG. 9 is a schematic diagram of a connecton kernel arranged in accordance with the principles disclosed herein.
FIG. 10 is a table that represents a partial view of the DESMOS hierarchy, the implementation of the principles of the invention herein.

FIG. 9 represents a block diagram of the Connecton Kernel 902. For simplicity, we have only represented a connecton ensemble 904 with its executive 906 and with just one connecton 908 in FIG. 9. The information about channels is only depicted for connecton C 908. The main difference between the abstract description of ensembles and the actual implementation is that connectons keep their own channel information. This option is more efficient and can become easier to implement in parallel/distributed computers.

Each connecton or connecton ensemble has a reference to the ensemble within which it belongs 914, 924. This reference, however, is nil if the connecton is the topmost one. The ensemble connecton also has a reference to its executive 912. Additional variables are currently used to manage the link information: extChannels 928 is an association list where each entry has the format gate→((connecton$_1$,gate$_1$,fFiiter$_1$,rFilter$_1$),
(connecton$_2$,gate$_2$,fFilter$_2$,rFilter$_2$),
(connecton$_n$,gate$_n$,fFilter$_n$,rFilter$_n$))

where gate$_i$ is an input gate if connecton i is not the network, and is a network output gate otherwise. The variable intChannels 918 is associated with the network and defines all the channels starting at the network input gates. The two variables are defined for implementation convenience: revExtChannels 930 and revIntChannels 922. The reverse channels are maintained to make the operation of removing connectons in run-time, faster. There is a reverse channel for each (direct) channel in the model.

Each entry in the list represents a channel connecting two gates. A gate can have several channels to different gates. There is no constraint on the number of channels from a gate, or into a gate. For each channel there are two filters: direct (forward) and reverse filters.

XVI. Message Table

Channels among connectons are stored in a message table. A message table has one entry for each gate, and associated with each gate can be an arbitrary number of channels.

Variables extChannels 920 and intChannels 918 are instances of class MessageTable, that implements a mapping table for messages. Each message is an instance of class SCMessage and is defined by 6 variables:

m_sender, the connecton that sends the message;
m_receiver, the connecton that will receive the message;
m_selector, the message name;
m_arguments, the message arguments;
fFilters, channel direct (forward) filter; and
rFilters, channel reverse filter.

The SCMessage method value is defined by
value

--- m_receiver_sender: m_sender.
(fFilter == Identity) & (rFilter == Identity) ifTrue: ["No filters"
 ^m_receiver _perform: m_selector withArguments: m_arguments].
"Only one argument signals are implemented"
"Apply filters"
^rFilter value:(m_receiver _perform: m_selector withArguments:
 (Array with: (fFilter value: (m_arguments at: )))).

---

Each channel can have two filters: forward (direct) and reverse represented by variables fFilter and rFilter, respectively. These filters transform the values sent to a gate, and the values returned from a gate, respectively. Filters are an effective solution to couple gates with different signatures without the creation of additional connectons to make the adaptation. If no filter is set, a default filter called the Identity is used. The Identity class method value: just returns the input value, and is defined by !Identity class method!

value: aValue "Implements the identity function filter"
  ^aValue.

EXAMPLE

We describe a connecton that sends and accepts values in Km that need to be linked with connectons that work in Meters and Miles. The structure of the connecton is given by the method connectonStructure

---

|t|
t := super connectonStructure.    "The parent returns the empty structure"
t add: #Km model: VelocityKm.    "Km connecton"
t add: #M model: VelocityM.    "Meters connecton"
t add: #Mi model: VelocityMi.    "Miles connecton"
t link: #Km gate: #out to: #M gate: #in: filter:
    [:x| x*1000] filter: [:x| x/1000].
t link: #Km gate:#out to: #Mi gate:#in: filter:
    [:x| x/1.65] filter: [x| x*1.65].

---

Links are established by the method link:gatet:to:gate:filter:filter:, where he first filter is the direct filter and the second is the reverse filter. The direct filters convert Km into meters and miles and the reverse filters makes the reverse conversions. Filters permit to join gates with different interfaces without additional elements. Channel filters can be combined with gate output functions. For example the output function of gate outs could sum all the input values in Km from connectons #M and #Mi.

In the current implementation only one argument signals can have direct and reverse filters. The reason is the complex Smalltalk syntax necessary to handle general number of arguments. In this case filter functions would become difficult to read.

XVII. Message Breaking

The current implementation keeps the information about channels distributed in the out variable 932, 934 of each connecton 908, 906 so the executive is only invoked to handle changes in the structure (i.e., message breaking). This design, although it implements conceptually the role of the executive, might prove more efficient in distributed applications. Additionally, caching systems can also be become easier to implement. When the number of channels is very large, a central store implementation would need a hashing system to handle messages efficiently. Thus distributing channel information is an effective way to avoid hashing. In static structure networks, the message doesNotUnderstand: is not strictly necessary if some pre-processing is done before compilation, replacing calls to variable out with a defined message. In this case the exception mechanism would not be necessary and the implementation becomes faster. So the breaking process could be implemented as a pre-processor by those skilled in the art. The actual code of the message doesNotUnderstand: implemented in Smalltalk MT is as follows !ConnectonOutput 05:24-Oct. 4, 1997!
doesNotUnderstand: aMessage

```
|ms selector filter|
selector := aMessage at: 2. "selector"
ms := extChannels at: selector ifNone: nil.
ms is Nil ifTrue: [self error:'Gate:',selector asString,'does not exist.'].
filter := filters at: selector ifNone: nil.
^self_broadcast: ms arguments: (aMessage at: 3) filter: filter.!!
```

As shown, aMessage is a 3-element array described by: [receiver, messageName, arguments]. This method acts as a message breaker that divides a message into the receiver, the selector (message name), and the arguments. The reader should note that Smalltalk is one of the few languages where this breaking mechanism is so easy to use, in spite that the original intention was exception handling.

The call _broadcast: aMessage arguments: arguments filters aFilter, broadcasts messages to all connectons linked to a gate. The last argument represents the gate output function. This function is used to handle the set of input values to a gate. The method_broastcast:arguments:filter: is defined in class Output, a parent class of ConnectonOutput and NetworkOutput classes, and is given by
!Output 09:04-Oct. 4, 1997!
_broadcast: nMessages arguments: anArray filter: filter

```
|ret |
filter is Nil ifTrue: [
    |value|
    "Default behavior: no filter is defined at the output gate"
    (nMessages size = 0) ifTrue: [^nil].
    "if there are no charnels returns nil"
    ret := nil.
    nMessages do: [:m|
        value := self _send: m arguments: anArray.
        (value == DeletedChannel) ifFalse: [ret := value].
    ].
    ret "Returns the last value"
]
ifFalse: [
    |value| "A filter is defined"
    ret := OrderedCollection new.
    nMessages do: [:m|
        value := self _send: m arguments: anArray.
        (value = DeletedChannel) "The channel has heen deleted,ignore it"
            ifFalse: (ret add: value]. "Collects all input values"
    ].
    filter value: ret. "Applies the filter to the input list"
]!!
```

There is a default behavior in the absence of filters. If an output gate has no filter assigned, the method returns the last value received, or the value nil if the output gate has no channels. When a filter is defined, a list of input values is collected and the filter is applied to this list to compute the return value. The default behavior was chosen for it seems to be used in most of the situations. The call _send: a SCMessage arguments: anArray, sends a signal to linked connectons, and is defined by
!Output 09:04-Oct. 4, 1997!
_send: aSCMMessage arguments: anArray

```
|receiver|
aSCMessage isNil ifTrue: [^DeletedChannel]. "The channel has been deleted"
aSCMessage arguments: anArray.
receiver := aSCMessage receiver.
```

"Send signal to the connecton"
(receiver ~= networkOutput) ifTrue: [^aSCMessage value] .
"Send signal to external connections"
^receiver _extMesasage: aSCMessage arguments: anArray. ! !

This method makes the separation between signals that are sent to connectons inside the network, and signals that are sent to connectons outside the network. In the later case, gate names are translated using the link information of the parent network. Variable networkOutput 910 is used to send messages from a network to external connectons.

The call _extMessage: aSCMessage arguments: anArray is defined in the network output to access connectons outside the network, and is defined by
!NetworkOutput 09:04-Oct. 4, 1997!
_extMessage: aSCMessage arguments: anArray

```
|ms selector filter|
selector := aSCMessage selector.
ms := extChannels at: selector.
ms isNil ifTrue: [self error: 'Port:',selector asString,'does not exist'].
filter := filters at: selector ifNone: nil.
^self_broadcast: ms arguments: anArray filter: filter!!
```

Networks also need to break messages. Although messages coming from a connecton within a network can be easily sent to the output directly, because they are already broken, messages arriving to the network from the outside must also be identified for they can come from a standard calling mechanism, that is, the message connecton message must work whenever connecton represents a basic connecton or the connecton is an ensemble. The message breaker in the network is defined by
!NetworkOutput. CALLBACK methods 09:04-Oct. 4, 1997!
doesNotUnderstand: aMessage

|ms selector filter|
selector :=aMessage at: 2. "selector"
ms :=intChannels at: selector ifNone: nil.
ms isNil ifTrue: [self error:'Gate:', selector asString, 'does not exist'].
filter :=inFilters at: selector if None: nil.
^self_broadcast: ms arguments: (aMessage at: 3) filter: filter.!!

If the network is an inner model and it is not accessed by regular messages, signals are transmitted by the method _perform:withArguments: defined by
!NetworkOutput 09:04-Oct. 4, 1997!
_perform: selector withArguments: arguments

```
|ms filter|
ms := intChannels at selector ifNone: nil.
ms isNil ifTrue: [self error.'Gate:',selector asString,'does no exist'].
filter := inFilters at: selector ifNone: nil.
^self_broadeast: ms arguments: arguments filter: filter.!!
```

Message broadcast is done by the method already described before because both ConnectonOutput and NetworkOutput are subclasses of class output.

XVIII. Support for Structural Changes

The following methods were defined in the DEMOS System to change the connecton structure during the execution of a program:

- addConnecton: aConnecton name: aName, adds a new connecton aConnecton, with an identifier aName;
- link: aName gate: aGate to: bName gate: bGate filter: dFilter filter: rFilter, links aConnecton named aName gate aGate to gate bGate of connecton bName, establishing direct filter dFilter and reverse filter rFilter;
- link: aName gate: aGate to: bName gate: bGate, links aConnecton named aName gate aGate to gate bGate of connecton bName, direct and reverse filters are assumed to be the identity function;
- removeConnecton: aName, removes the connecton named aName and all its channels;
- replaceConnecton: aName with: bConnecton name: bName, replaces a connecton named aName with connecton named bName;
- unLink: aName gate: aGate from: bName gates bGate, unlinks aConnecton named aName gate aGate from gate bGate of connecton bName;
- unLink: aName gate: aGate, deletes all the links starting at aGate of connecton named aName.

A connecton is referenced by a name and not by a pointer. Connecton names are assigned to connector instances in the connecton structure definition.

XIX. Structural Inheritance

New connectons are seldom built from scratch. Instead they are usually built using an existing connecton class as a template. A new class is defined just by incorporating all common features of the existing class and by the addition of some new characteristics (methods and state variables). Inheritance provides not only an effective means for code reuse but also a mechanism for grouping related models in a taxonomic hierarchy. Structural inheritance is an effective way to build new connectons from existing ones. Support for reusing structural objects is given by inheritance of structure in a similar way to code reuse in conventional inheritance.

A connecton name is just an alias that can be used to define the network structure. Each connecton name is associated to a connecton class. To build a connecton, names in the structure definition are replaced by an instance of a connecton class. The network structure is thus a template, and actual networks are obtained by replacing aliases by instances. In the DEMOS environment (as the illustrative embodiment of the inventive connecton paradigm disclosed herein), the following operations are defined over the structure of a network:

- addConnecton: aName, class: aClass, adds a new connecton of class, aClass, to the network structure;
- removeConnecton: aName, removes a connecton from the network structure;
- replaceConnecton: aName byClass: aClass, replaces the class associated with aName by aClass;
- link: aName gate: aGate to: bName gate: bGate filter: dFilter filter: rFilter, creates a link and filters between two connectons;
- link: aName gate: aGate to: bName gate: bGate filter: dFilter filter: rFilter, creates a link between two connectons;
- unlink: aName gate: aGate from: bName gate: bGate, deletes a link between two connectons;
- unlink: aConnecton gate: aGate, deletes all the links from aGate of aConnecton.

In the DESMOS system connecton models are hierarchically organized. Connecton is the root class for all connecton classes. The class ConnectonExecutive is the superclass of all network executives. This class implements all basic operations that support changes in connecton network structure. These operations include adding and deleting connectons and links. Every specific domain connecton network must be a subclass of the class ConnectonExecutive.

FIG. 10 represents a partial view of the DEMOS hierarchy, as described above. All the subclasses of the class ConnectonExecutive can inherit the structure of the parent class. The ConnectonExecutive class provides just an empty connecton network.

Structural inheritance can be used for several purposes. For example, a connecton superclass can be used to provide the common structure to its connecton subclasses. These connecton subclasses therefore must only just add the structural differences. We illustrate the use of inheritance to create a NOR4 gate (FIG. 13) from an OR4 gate (FIG. 11). FIG. 11 represents the OR4 gate 1102, which includes 4 inputs in1 1112, in2 1114, in3 1116 and in4 1118, and one output gate out 1120. The OR4 gate 1102 is a network made of 3 basic two input OR gates OR1 1104, OR2 1106 and OR3 1108 and an OR4 executive 1110. The definition of the OR4 connecton class in given FIG. 12, where the definition of the network is made within the connecton Structure method.

From the OR4 connecton class we can easily derive the NOR4 class depicted as NOR4 gate 1302 in FIG. 13. The DESMOS definition is given in FIG. 14, where the method connectonStructure only needs to define the differences from the initial OR4 gate 1102 depicted in FIG. 11. In FIG. 13, the NOR4 gate 1302 includes the OR gates 1104, 1006 and 1108, the NOR4 executive 1306 and the NOT gate 1304. In the definition of FIG. 14, the first line obtains the structure of the parent class. The second line adds a model named #NOT of connecton class NOT. Actual connectons are obtained by replacing aliases by connecton class instance. In this case, symbol #NOT is replaced by an instance of connecton class NOT named #NOT.

XX. The MVC Architecture and the Dependency Mechanism

Figure 16:
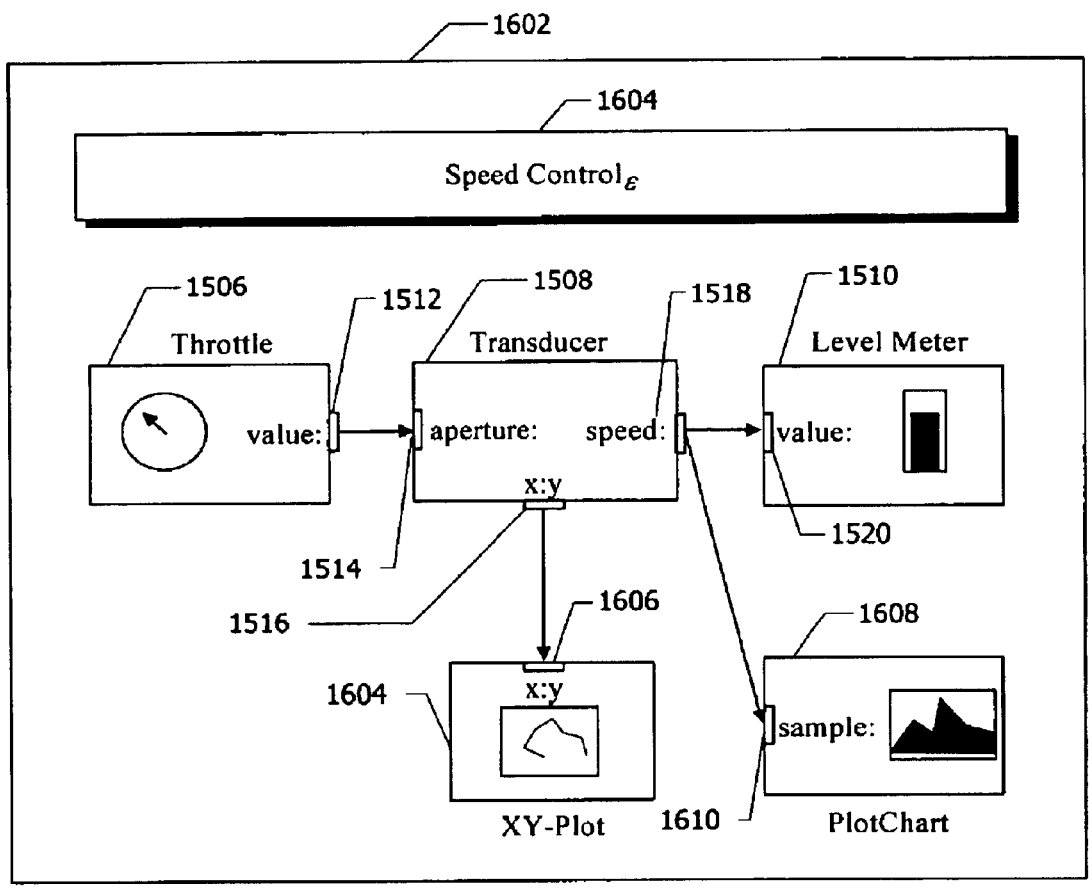
FIG. 16 is a schematic representation of a speed control system (class) of FIG. 15, further including two graphical widgets that display the value and velocity.

We now describe how the Smalltalk MVC framework can be implemented using connectons, see S. Lewis. *The Art and Science of Smalltalk*. Prentice Hall, 1995. We use a simple graphical system 1502 represented in FIG. 15, which displays the speed of a car. The transducer connecton 1508 receives at gate apperature: 1514 the throttle aperture from the throttle connecton 1506 that send the throttle aperture via gate value: 1512. The transducer connecton 1508 then coverts the aperture throttle to a value of velocity, and this value is sent to the output gate speed: 1518. The level meter connecton 1510 receives the velocity at gate value: 1520 and displays the speed of the car. It is noted that the transducer connecton 1508 includes a gate x:y 1516 that is not linked to any other connecton. The transducer operates independently of the connectons linked to its output. In the system of FIG. 16, two graphical widget connectons 1604 and 1608 that display the value of the velocity and position have been added. The system of FIG. 16 also includes a control executive 1604. A plot chart connecton 1608 has been added and linked through the establishment of a new channel between the gate speed: 1518 of the transducer 1508 and the input gate sample: 1610 of the plot chart 1608. An XY-Plot connecton 1604 was also added to draw car position over time. The input gate x:y: 1606 of the XY-Plot chart 1604 is linked from the output gate x:y: 1516 of the transducer 1508. The aperture: action of the transducer is defined by aperture: aValue

```
|speed position|
speed := self computeSpeed: aValue.
position := self computeSpeed: aValue.
out speed: speed.
out x: (position x) y: (position y).
```

A solution using the Smalltalk dependency mechanism cannot discriminate messages for it uses the same update: message to update the list of all the dependents. Thus all the objects will receive an update even if the message is not directed to them. Another Smalltalk limitation exists when new messages are created for in many cases existing objects need to be modified to understand new update message parameters. The unstructured dependency mechanism of Smalltalk was replaced by the structured concepts of gate and channels in the connecton approach of the present invention. In this example, the advantages of the connecton programming are evident.

XXI. Connectons vs. Objects

The object paradigm relies on absolute method and instance addresses. The typical message sending consists of a name of an object followed by the name of the method and some arguments. If a widget displays a number on a window, the command to change the information would have the following format:

aWidget display: aNumber aPicture x: newX y: newY.

Although clear, this process of communication between objects has two main constraints to obtaining reuse. First, aWidget is typically a reference to an existing object. Second, display: is a message that the object can understand. To be truly reusable, objects should not rely on this specific information. The absolute address does not allow the object to be used with a new kind of widget that to show a number uses a method named show: instead of display:. A straightforward solution to solve the first problem is the use of an indirect reference. In this case, the variable aWidget could be instantiated after the creation of a specific widget object. However, this solution does not solve the problem of a possible different method name in the outside object. This simple solution has also another problem: it does not allow that the same message may be sent to an unknown number of other objects.

Connectons overcome these problems by specifying the outside world through a reference to the pseudo variable out. Any messages that cannot be handled locally by the connecton are sent to the outer world in a general and simple way. The code to display a number using connectons would be out display: aNumber.

out x: newX y: newY.

As can be seen, the same message protocol is used to achieve different results. Both "displaying a number" and "moving a picture" are messages sent to outer connectons through the variable out. In consequence of the relative messages, names, actual widgets and pictures can have very different message names to handle the intended actions. The mapping between message names is handled by the linkage mechanism of connectons. Messages are ignored if the outside world does not exist. Moreover, the number of connectons linked to a gate is arbitrary. The current mechanism returns nil as a default value of a message sent to several connectons. When a message is sent to just one connecton, the current implementation returns by default the value sent by that connecton. Connectons provide a simple way to monitor variables. The explicit mechanism to monitor variables is less prone to error than the standard mechanism of active values or daemons.

The DEMOS language, illustrating the connecton paradigm disclosed herein, can use all original Smalltalk libraries because it may also use the standard message protocol. Objects can be seen as connectons with input gates and no output gates. Objects, thus, can be used as terminal connectons.

This flexibility achieved by connectons involves, however, a higher computational cost, mainly to translate output gates to input gates. Connecton-oriented programming can make effective use of a CASE tool where connections among connectons can be graphically depicted and edited. The translation between such a CASE tool and the actual code would be straightforward to those skilled in the art. Also, the realization of a library of connectons will be very simple to achieve due to connecton encapsulation.

XXII. Connectons vs. Hardware

Traditional hardware has been referred to herein as having a high quality standard, which is lacking in traditional software. The connecton paradigm of this invention, however, not only approaches the high hardware quality standard, but also can be clearly shown to overcome it. The first feature is hierarchy, while hardware is modular, it cannot implement hierarchical concepts. The second feature is that compared with hardware, the connecton structure is dynamic by design. Connectons can change composition and channels at run-time. Hardware is not typically automatically reconfigurable.

XXIII. Connectons vs. Patterns

Figure 17:
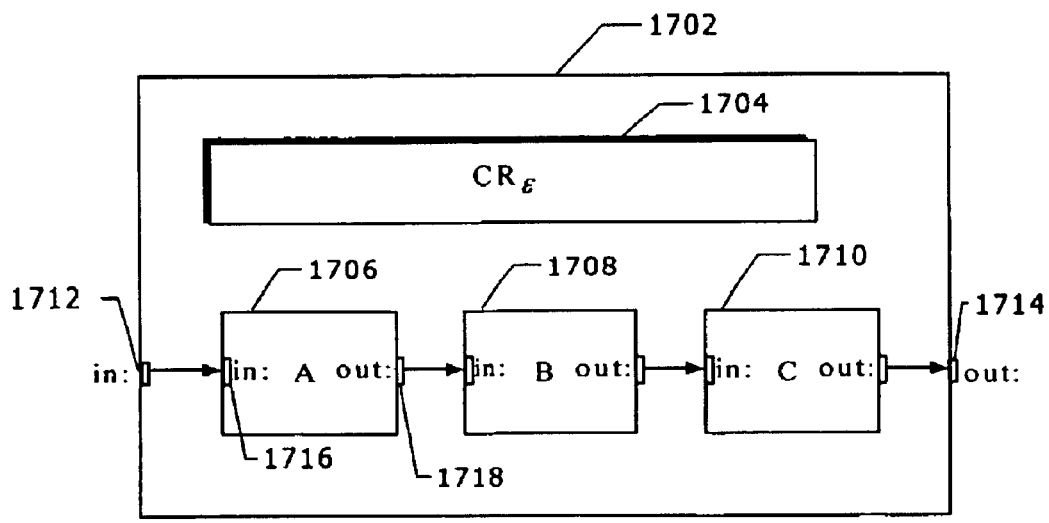
FIG. 17 is a schematic representation of a chain of responsibility connecton implemented in accordance with the principles set forth herein.

To show the power of the Connecton paradigm, we now describe an example taken from the software design pattern approach and compare it with the corresponding Connecton solution. Most of the so called structural patterns described in, E. Gamma, R. Helm, R. Johnson, and J. Vlissides. *Design Patterns: Elements of Reusable Object-Oriented Software*. Addison-Wesley, 1995, and remarkably, some of the behavior patterns can be replaced by connectons without the introduction of additional elements, or a simplification of the problem. The Chain of Responsibility pattern, categorized as a behavioral pattern, is a framework to pass commands through a chain of objects. Each object in the chain has two possibilities: to accept the command or to pass it to the next element in the chain if the command cannot be locally handled. Each pattern is based upon a set of special purpose classes. The connecton solution, depicted in FIG. 17, does not demand any special model to handle chains. A chain is just a special topology, that is, a chain is just a specific problem of Connecton composition. The chain connection 1702 depicted in FIG. 17 includes an executive connecton 1704, connectons A 1706, B 1708 and C 1710. The chain connector 1702 includes a gate in: 1712 and a gate out: 1714. Each of the connectons 1706, 1708 and 1710 includes a gate in: 1716 and a gate out: 1718.

Most of the structural patterns can be described by an ad hoc composition and do not represent a general purpose solution. Some of the patterns described in, see E. Gamma, R. Helm, R. Johnson, and J. Vlissides. *Design Patterns: Elements of Reusable Object-Oriented Software*. Addison-Wesley, 1995, treated as independent, are in reality seen as the same in the Connecton paradigm. Examples are the patterns Composite and Facade that in the Connecton paradigm only present different topologies. Patterns seems thus to lead to an arbitrary taxonomy.

We describe now in mode detail the Connecton solution for the Chain of Responsibility problem. Each connecton in the chain can be described by in: aMessage
   self respondsTo: aMessage ifFalse: [^out out: aMessage].
   ^self accepts: aMessage Messages that cannot be handled locally are just sent to the outside. The actual code that will be invoked depends on the existing links, or in other words, it depends on the existing specific structure.

Solutions categorized by the class-subclass relationship do not show any fundamental characteristic of the problems. Because traditional solutions based on Objects fail miserably to represent structure, one is forced to find specific solutions to every problem that demands for a structural representation. Because structure has shown to be an evasive issue, different solutions are commonly obtained for problems that appear to be different only because the structural perspective is not considered. Thus, significant programming effort is wasted because today's paradigms fail to represent structure.

XXIV. Analysis and Design

Traditional software engineering approaches divide the development of new information systems in 4 large phases: analysis, design, implementation and testing. Connectons can have a strong impact on these traditional phases for the first three are all done simultaneously. Analysis can be broadly defined as the specification of the problem and the identification of sets of inputs and outputs to the system. Design is usually referred as the process of translate the analysis specifications into programming modules, and implementation is the result of translating design into a computer language. These three phases are independent, so each phase produces some document to the next stage. The major drawback of this approach is that it is difficult to enforce the integration between these phases, and for example, there is not a mechanism to ensure that design has fulfilled all the analysis requirements.

With connectons, analysis design and implementation are all done using the same tools. Analysis and design are actually the same procedure. At the end of the analysis phase, a set of hierarchical connectons and their interconnections is defined. That is, and surprisingly, the implementation model is almost finished. To complete the actual implementation, only basic connectons that are not yet defined in some connecton library need to be developed. Thus the Connecton paradigm represents a major breakthrough in software engineering.

A repository of connectons is the kernel of connectware reuse, and by economical reasons, it will constrain the software construction process. Like an architect that chooses standard height and width for doors and windows, connectware architects must utilize, where possible, existing connectons. Thus, analysis and design are constrained by existing connectons.

The test on connectons seems only to exist in the bottom up manner, and top-down testing seems to have no definition, for on the top there are only connections and no actual code. Thus it seems that test must be done hierarchically, from basic connectons to network connectons. Because connectons provide a modular approach, connectons can be tested independently. Special testing methodologies must be developed to access the correctness of dynamic structure connectons.

XXV. Implementation Aspects

While the connecton paradigm was described herein with respect to the DESMOS system, various other implementations (not limited to Smalltalk) of the connecton paradigm may be utilized in various systems.

For example, the current implementation of the DEMOS system runs in one single processor computer and with one single thread of control. Connectons, however, may also be located in different processes, in different processors and even within different computers. The nature of the connecton programming does not change, only links must be completed with the physical location of the connectons. This location can include the process identifier, the processor identifier and the machine identifier. For example, if two connectons are located in different computers connected through the Internet, location must include the IP of the computers. Please note that in the implementation defined and described herein, this information is not necessary because all the connectons are in the same location.

More particularly, the current implementation runs in a single thread of control. Multiple threads and multiple active connectons can be easily accommodated. Concomitantly, traditional methods for control of access to shared memory, e.g., semaphores and critical sections may be employed. While the described embodiment is synchronous, an asynchronous design may be easily implemented in a multi-threaded version by those skilled in the art.

Furthermore, the current implementation requires that the connectons be created from their models (classes) before use. Providing connectons with a persistent storage mechanism would allow connectons to be stored and loaded into memory without creation from scratch utilizing their class description. Persistency is a technique currently used for storing objects in databases. And as stated above, links may be stored in the network executive or may be distributed among connectons (based on efficiency).

The message breaking mechanism described above is dependent upon the Smalltalk dialect used for implementing the connecton system. Other Smalltalk dialects have their own specificity for message breaking. In the DEMOS implementation described herein, the message breaking mechanism was implemented using the error handling mechanism of Smalltalk MT, see *Smalltalk MT User's Guide*. Object Connect, 1995. No other languages are known to provide these primitives to implement the message breaking mechanism described. However, it should be apparent to those skilled in the art how to incorporate the basic mechanisms for eliminating absolute object/methods addresses in the compilers of any of the multitude of existing computer languages. That is, although the mechanisms may be different from those employed in the Smalltalk language, the connecton paradigm is not limited thereto.

If the operating system needs to change the physical location of a connecton, ex.: for load balancing purposes, only links need be updated by the operating system. The connecton structure should remain the same and no connecton should be re-programmed. Thus, operating system procedures, like load balancing procedures, do not change the nature of this invention. The several methods described may be merged, and an implementation that utilizes one or a group of the previous characteristics can be easily developed. For example, the multithreading version of the connecton paradigm can be constructed into a system that runs on several microprocessor computers linked by a computer network.

Also, some technical difficulties must be solved, for connecton based languages demand capabilities not usually found in the most common compilers. Although static structure connectons can be implemented efficiently by simple changes in current compilers, dynamic structure connectons will demand better support of compilers. If the ability of dynamic structure software is not used, current compiler technology can produce Connecton code as efficient as Object code. In this case, hierarchical models could be flattened, that is, the hierarchy is removed, and all channels can be replaced by actual message calls. Multiple channels starting at the same gate could be replaced by an iteration by the compiler with this simplification, Connectons could be easily incorporated into current compiler technology. This is easily accomplished by those skilled in the art. In this case the out variable mechanism would have a simpler implementation than those described for the DESMOS system, that involves the Smalltalk error handling mechanism.

Dynamic structure does not permit the removal of the hierarchy, and caching connectons and channels may prove a good solution to improve efficiency. Caching would avoid the repetition of the actions necessary to find all the components connected to a gate. This information could be kept and updated when a change in structure occurs.

In the DESMOS systems links and Connectons gates are specified directly in the programming language. However, the implementation of a graphical interface, like for example a CASE tool, to help defining connectons will be easily accomplished by those skilled in the art.

The present implementation of Connectons is currently stored in a computer hard disk and is loaded into computer RAM in order to run. Other forms for storing an implementation of connectons, like CDROM, DVD, floppy disk, or magnetic tape could also be used. A connecton implementation can also be stored and run from PROM, EPROM, EEPROM or any other computer memory technology.

XXVI. Conclusions

In conclusion, traditional objects describe only terminal connectons and thus are not fully reusable. Connecton reusability is achieved by removing all absolute addresses from connecton definition and by viewing software units as structural entities. Connectons, therefore provide full support for software reusability. Under the Connecton paradigm, software is built in a hierarchical and modular form. Connectons are thus suitable for building large software systems that can be easily reused. The Connecton paradigm scales well and it can be used in the implementation of systems, ranging from the most simple to the most complex.

Connectons are a paradigm shift for software engineering for they encompass a new way for building software by the use of independent and reusable software units. Connectons will obviously have a strong impact on the way software is made. The process development cycle will be completely changed by the existence of a connecton repository that will influence all phases of software life cycle. This cycle will be constrained by economical factors and existing connectons will be used when possible, and impose strong constraints to the analysis in the same way that standard doors and windows constrain the project of a house.

Connectons, because of their simplicity, open the door of software reuse to everyone, for its use does not need any special skills or expertise. Thus small and large software houses and individual programmers can turn their software work into reusable Connectonware just by using connecton programming.

The reader should note that legacy is the major enemy of any new software paradigm. Work needs to be done to make existing software compatible with the new connectonware. Nevertheless, current objects are compatible with connectons and can be used not only to implement the state of connectons but can also be used as terminal connectons. Another possibility is to wrap current objects inside connectons.

Finally, dynamic structure models as taught herein open a gate to the dynamic update of software systems. Because Connectons can be dynamically configured, one can easily foresee a scenario where software can be upgraded by changing some of the connectons that become obsolete. This is especially important in running non-stop systems, like real-time systems, where this task would have a large economical impact.

The many features and advantages of the present invention are apparent from the detailed description, and thus, it is intended by the appended claims to cover all such features and advantages of the invention which fall within the true scope and spirit of same. Moreover, since numerous modifications will readily occur to those skilled in the art, it is not desired that the present invention be limited to the exact construction and operation illustrated and described herein and accordingly. All the suitable modifications that are equivalent are intended to fall within the scope of the claims.

What is claimed is:

1. A software ensemble stored on a computer readable medium and executable by a computer, the software ensemble comprising:

a plurality of software units, each software unit of said plurality of software units including a method and data;

an executive software unit including links between said plurality of software units;

wherein a software unit of the software ensemble is described by a model M, given by:

$$M=(inGates, \{inSign_g\}, \{a_g\}, Q, q_0, outGates, \{outSign_{gt}\}, \{outFunction_{gt}\}),$$

where inGates is the set of software unit input gates, outGates is the set of software unit output gates, $a_g$ is an action for every g in inGates, Q is the set of software unit states, $q_0$ is the software unit's initial state, in $Sign_g$ is the gate g input-output signature for each g in inGates, $outSign_{gt}$ is the gate gt input-output signature for each gt in outGates, $outfunction_{gt}$, is the gate gt output function for every gt in outGates, where the signature is a 2-tuple containing the range set of incoming and outgoing parameters, and the output function of gate gt maps a set of incoming values into a value belonging to the input signature of the output gate gt.

2. A software ensemble stored on a computer readable medium and executable by a computer, the software ensemble comprising:

a plurality of software units, each software unit of said plurality of software units including a method and data;

an executive software unit including links between said plurality of software units;

wherein the software ensemble, E, is defined by:

$$E=(inGates, \{inSign_g\}, \epsilon, M_\epsilon, outGates, \{outSign_{gt}\}, \{outFunction_{gt}\}),$$

where $\epsilon$ is the ensemble executive that keeps a structure of the ensemble, and $M_\epsilon$ is the model of the ensemble executive, inGates is the set of the ensemble software unit input gates, $inSign_g$ is the gate g input-output signature for each g in inGates, outGates is the set of ensemble software unit output gates, $outSign_{gt}$ is the gate gt output-input signature for each gt in outGates, and $outFunction_{gt}$ is the gate gt output function for every gt in outGates, where a signature is a 2-tuple containing the range set of incoming and outgoing parameters, and the output function of gate gt maps a set of incoming values into a value belonging to the input signature of output gate gt.

3. The software ensemble according to claim 2, where the model of the ensemble executive is defined as a model of a software unit augmented with a structure function $\sigma: Q \rightarrow \Sigma^*$, where Q is the state set of the ensemble executive, and each structure $\Sigma$ in is equal to $(C, \{M_e\}, L, \Xi)$, where C is the set of software units that belong to the ensemble, $M_e$ is the definition of each software unit c, belonging to set C, L is a set of channels, and $\Xi$ is the order function indicating a sequence in which actions are invoked.

4. The ensemble executive according to claim 3, wherein a channel is a 3-tuple defined by:

$$((i, g_i), (j, g_j), (dF, rF)),$$

where i is the name of a sender software unit, $g_i$ is a gate of i, j is a receiver software unit, $g_j$ is a gate of j, dF is the channel direct filter and rF is the channel reverse filter, where a filter defines a transformation that is applied to the values communicated through a channel.

5. The software ensemble according to claim 3, wherein an input gate and the channels determine the methods invoked at the one or more of the plurality of the software units when a message is received by the input gate of the software ensemble.

6. The software ensemble of claim 3, wherein the output gate of a software unit and the channels determine the messages to be sent through the output gates of the software ensemble.

7. The software ensemble according to claim 4, wherein when a value x is sent from $g_i$ to gate $g_j$ by a channel $((i, gi), (j, gj), (dF, rF))$, the software unit j performs j $a_{gi}$ returns the value $rF(J\ a_{gi}\ dF(x)$, where $a_{gi}$ is an action associated with the gate receiver software unit.

8. The software ensemble according to claim 7, wherein when the receiver software unit is an ensemble, the value dF(x) is passed to the software units connected to the input port $g_j$ according to channel information defined for that ensemble.

9. The software ensemble according to claim 2, wherein structural inheritance is utilized to build new software ensembles from existing software ensembles.

* * * * *